United States Patent
Platt et al.

(10) Patent No.: US 10,281,675 B2
(45) Date of Patent: May 7, 2019

(54) OPTICAL APPARATUS

(71) Applicant: Starlight Xpress Ltd, Binfield, Bracknell, Berkshire (GB)

(72) Inventors: Terrence Christopher Platt, Binfield (GB); Michael Andrew Hattey, Wokingham (GB)

(73) Assignee: Starlight Xpress Ltd., Bracknell (GB)

( * ) Notice: Subject to any disclaimer, the term of this patent is extended or adjusted under 35 U.S.C. 154(b) by 488 days.

(21) Appl. No.: 14/808,104

(22) Filed: Jul. 24, 2015

(65) Prior Publication Data

US 2016/0025949 A1    Jan. 28, 2016

(30) Foreign Application Priority Data

Jul. 25, 2014  (GB) .................................. 1413262.5

(51) Int. Cl.
*G02B 27/30* (2006.01)
*G02B 7/00* (2006.01)
*G02B 7/02* (2006.01)

(52) U.S. Cl.
CPC ............ *G02B 7/006* (2013.01); *G02B 7/005* (2013.01); *G02B 7/021* (2013.01); *G02B 7/023* (2013.01); *G02B 27/30* (2013.01)

(58) Field of Classification Search
CPC ........ G02B 7/006; G02B 7/005; G02B 7/021; G02B 7/023; G02B 27/30
USPC ....................................................... 359/641
See application file for complete search history.

(56) References Cited

U.S. PATENT DOCUMENTS

| | | | | |
|---|---|---|---|---|
| 5,046,162 A | * | 9/1991 | Ishikawa | G02B 5/20 348/270 |
| 6,496,309 B1 | * | 12/2002 | Bliton | G02B 13/24 359/368 |
| 2005/0036142 A1 | * | 2/2005 | Oldham | B82Y 10/00 356/344 |
| 2008/0117425 A1 | * | 5/2008 | Kain | C12Q 1/6837 356/455 |
| 2008/0117518 A1 | * | 5/2008 | Wang | G01N 21/6452 359/618 |

FOREIGN PATENT DOCUMENTS

| | | | | |
|---|---|---|---|---|
| EP | 0615146 A2 | | 9/1994 | |
| EP | 0969327 A2 | * | 1/2000 | ......... G03F 7/70091 |
| WO | 2012098297 A1 | | 7/2012 | |

OTHER PUBLICATIONS

Starlight Xpress Limited, May 2009, "Handbook for the SX Universal Filter Wheel", www.sxccd.com [online], available from http://www.sxccd.com/handbooks/The%20Universal%20Filter%20Wheel.pdf [Accessed Dec. 3, 2014].

* cited by examiner

*Primary Examiner* — James Greece
(74) *Attorney, Agent, or Firm* — Young Basile Hanlon & MacFarlane, P.C.

(57) ABSTRACT

An optical apparatus for manipulating light in an optical system that includes means for mechanically coupling the apparatus to an optical input device with the optical system such thus received light passes from the optical input device onwards toward an optical processor and means for moving at least one optical component between an aligned position and a non-aligned position.

25 Claims, 7 Drawing Sheets

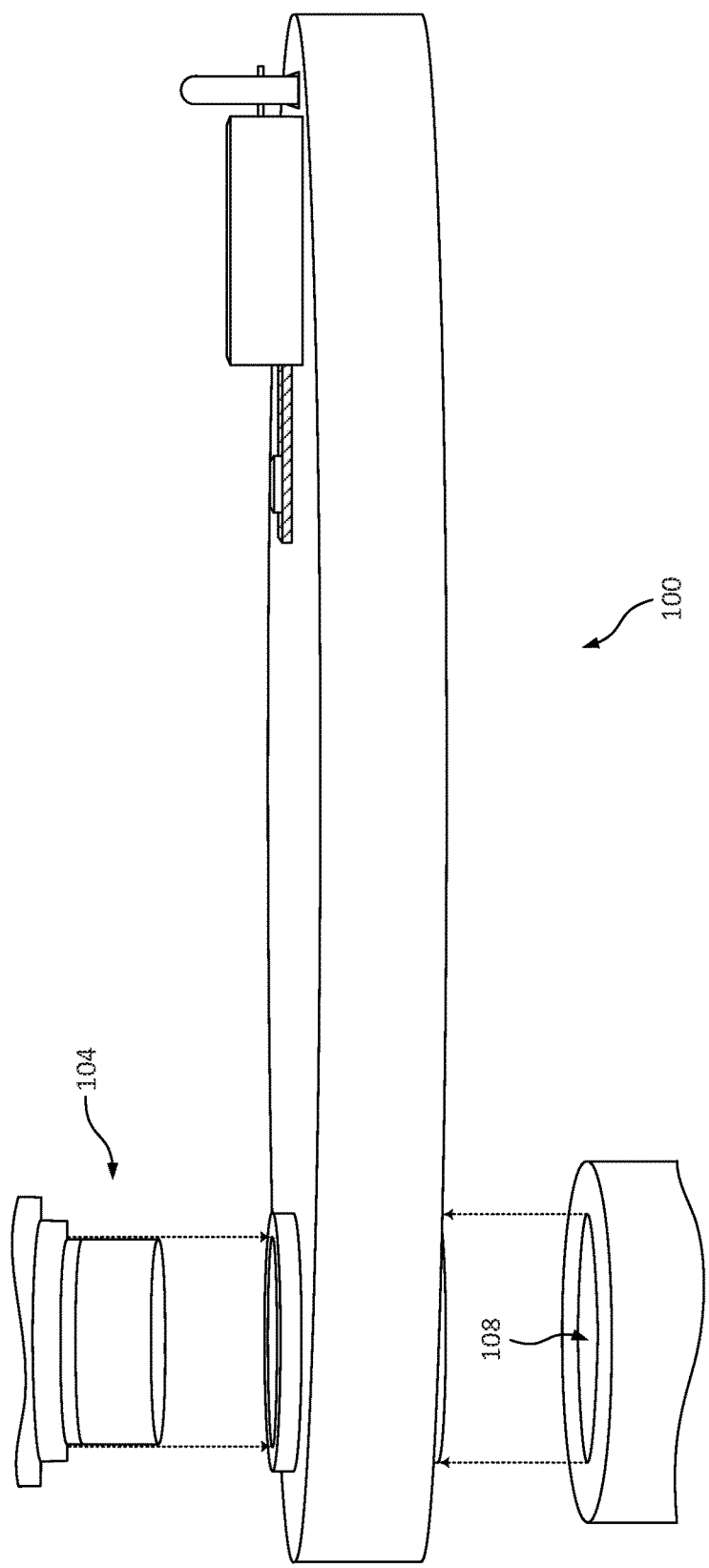

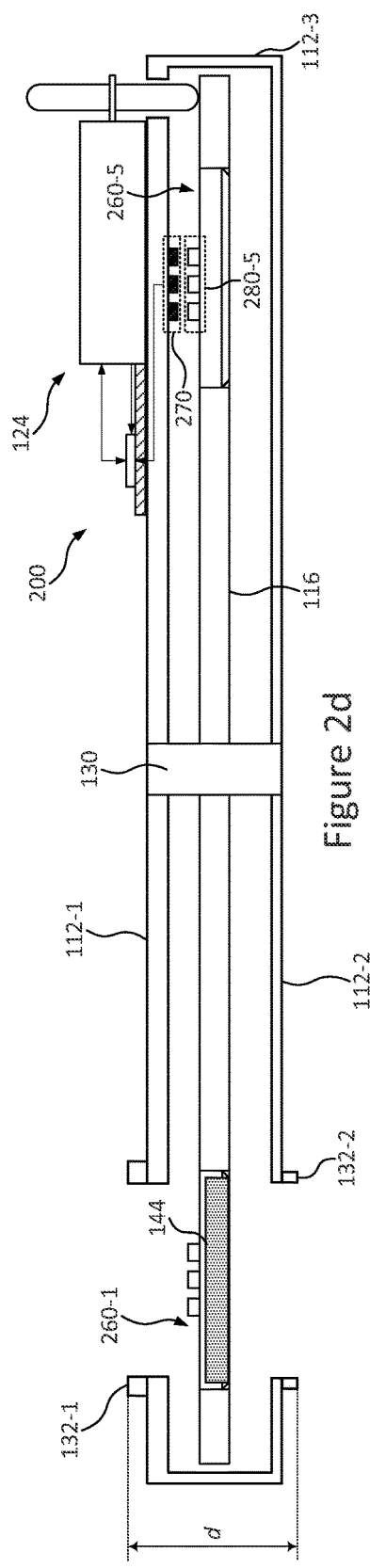
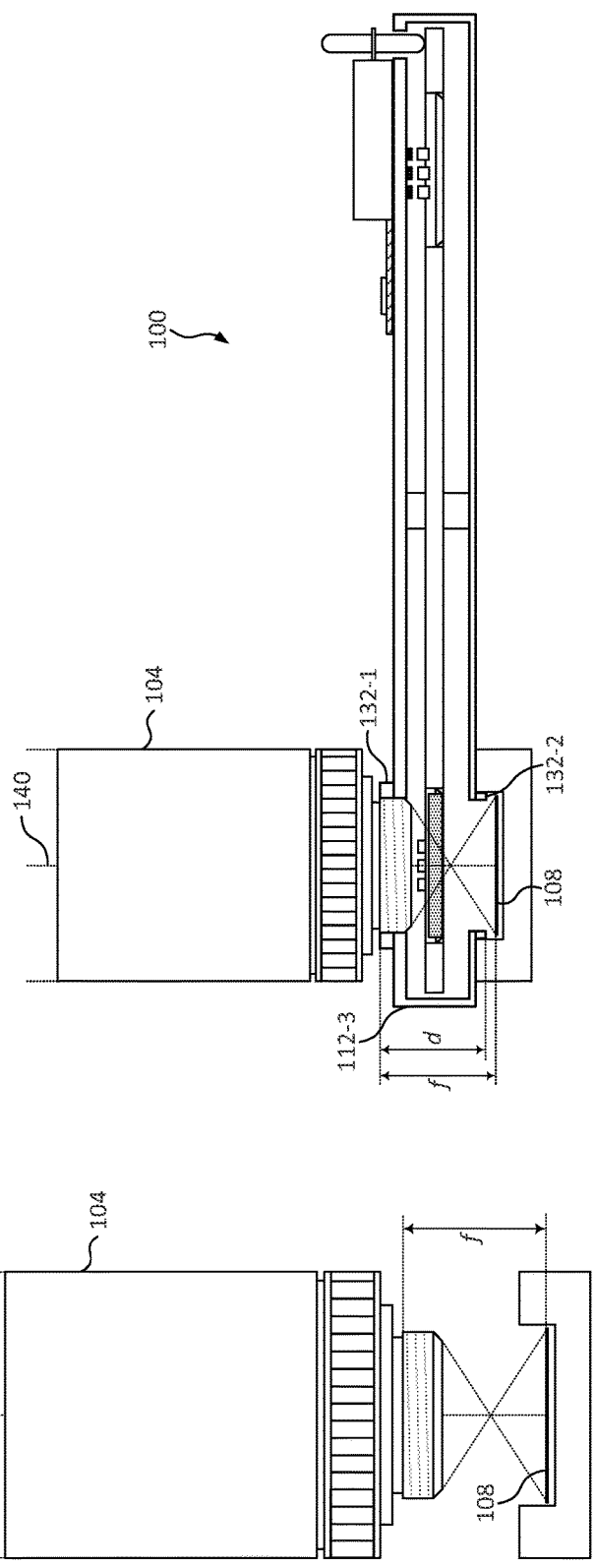
Figure 2d
Figure 3a
Figure 3b

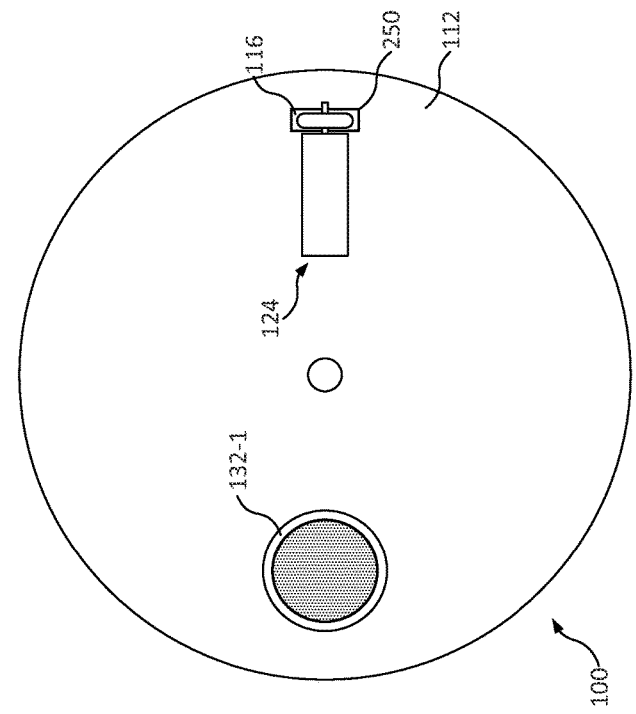
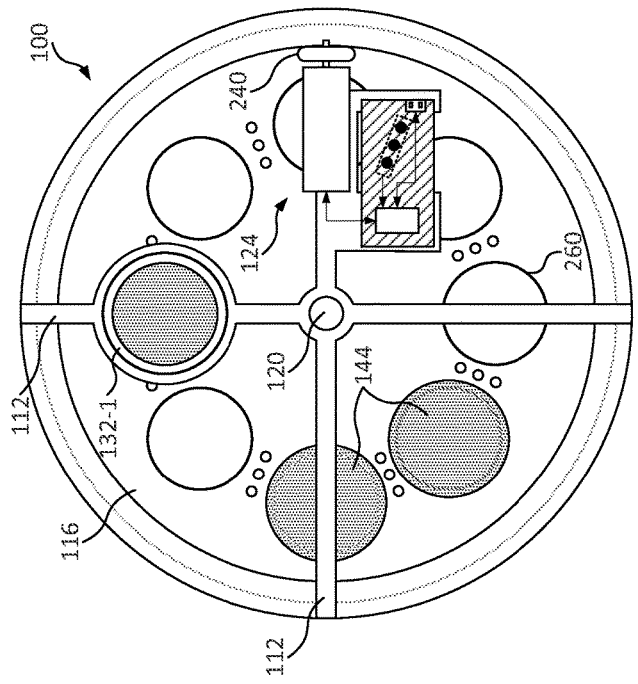
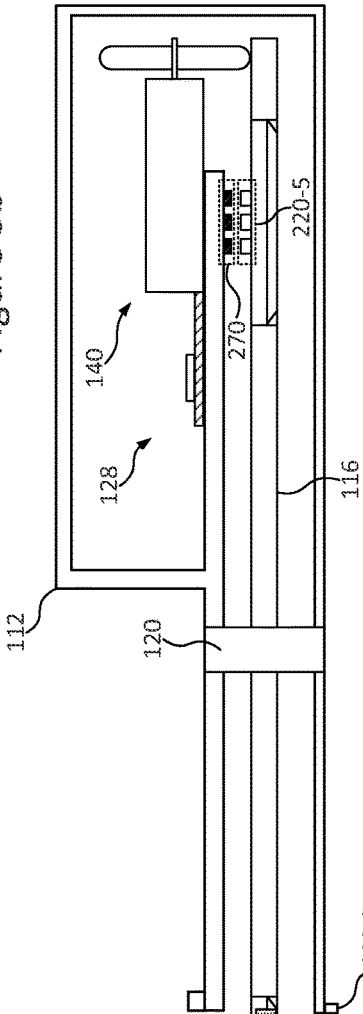
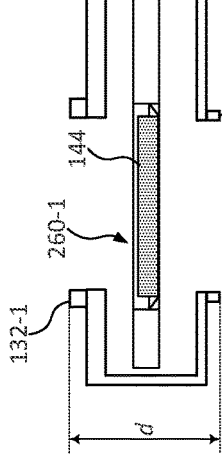
Figure 5a
Figure 5b
Figure 5c

OPTICAL APPARATUS

BACKGROUND

The present application claims priority to GB 1413262.5 filed 25 Jul. 2014, the specification of which is incorporated by reference herein.

The present invention relates to optical apparatus and associated methods of use of the optical apparatus.

Optical filter wheels are commonly used to insert a filter into a light beam or to remove a filter from a light beam and/or to position different filters in the light beam so that different optical wavebands may be isolated for study. Common applications of filters wheels are found in: astronomy (for example in order to analyse a star's colour); microscopy; laser beam passing or stopping; and fluorescence imaging (of biological samples for example).

Optical filter wheels are typically designed to be mounted on a lens of an optical apparatus, such as a camera, for filtering light as it enters the lens. Given the nature of optical arrangements commonly encountered in the above-mentioned fields, however, such filter wheels can be undesirably large and cumbersome and can therefore result in the optical apparatus being more unwieldy.

It is an aim of the present invention to alleviate at least some of the aforementioned problems.

SUMMARY

An optical apparatus for manipulating light in an optical system that includes means for mechanically coupling the apparatus to an optical input device with the optical system such thus received light passes from the optical input device onwards toward an optical processor and means for moving at least one optical component between an aligned position and a non-aligned position.

BRIEF DESCRIPTION OF THE DRAWINGS

The present invention is now described, purely by way of example, with reference to the accompanying diagrammatic drawings, in which:—

FIG. 1 shows a filter wheel arranged to fit between a lens and a camera;

FIGS. 2a to 2d show further views of the filter wheel;

FIG. 3a illustrates the lens and the camera in more detail;

FIG. 3b illustrates, in more detail, the filter wheel between the lens and the camera as illustrated in FIG. 3a;

FIGS. 5a to 5c are alternative examples of the filter wheel.

DETAILED DESCRIPTION

Figure 2A:
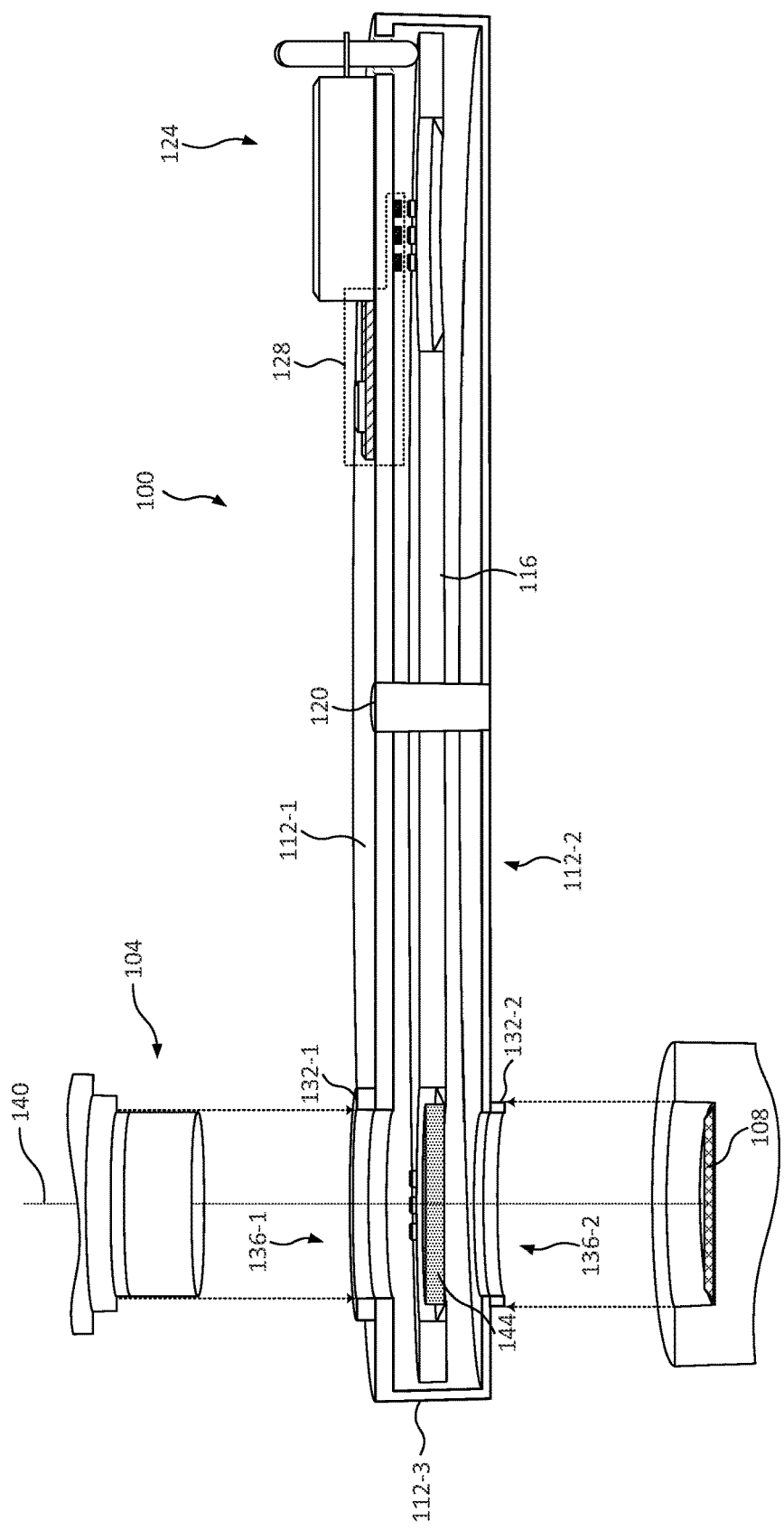

According to one aspect of the invention there is provided an optical apparatus for manipulating light in an optical system, which optical system comprises an optical input device for receiving light and an optical processing portion having an optical processor for processing the light received via the optical input device, the apparatus comprising: means for mechanically coupling the apparatus to said optical input device, within said optical system, such that light received via said optical input device passes from said optical input device, through said apparatus, onwards to said optical processor; and means for moving, when said apparatus is coupled by said means for mechanically coupling the apparatus within said optical system, at least one optical component between: an aligned position in which said optical component is located between said optical input device and said optical processor, for manipulating light received via said optical input device and for passing light so manipulated to said optical processor; and a non-aligned position in which said optical component is not located between said optical input device and said optical processor. In this manner the optical apparatus is adapted to fit between the optical input device and the optical processing portion. As such, smaller (and hence more cost efficient) optical components (such as filters) may be used to intercept the full beam diameter of light passing through the optical apparatus from the optical input. This arrangement therefore allows the optical apparatus to be made significantly smaller, and hence lighter, than if the optical apparatus were not positioned between said optical input device and said optical processor.

Preferably, the term "optical component" herein refers to any apparatus typically used to manipulate light and therefore includes lenses, windows, filters (preferably including polarizers), diffusers, gratings, prisms, collimators, beam splitters and apertures. The term "downstream" is preferably used to connote a principal optical axis and direction in an optical arrangement from an object to a plane onto which that objects is imaged. Accordingly, a "depth" dimension preferably refers to a distance in the downstream direction.

For providing optical acuity, preferably, said means for mechanically coupling the apparatus is configured for maintaining, when said apparatus is coupled by said means for mechanically coupling the apparatus to said optical input device, a predefined distance (e.g. a predefined flange focal distance) between a surface (e.g. a flange surface) of said optical input device and an image plane of said optical processor.

In compliance with typical predefined distances, preferably, said predefined distance is not more than 30 mm, preferably not more than 20 mm and more preferably not more than 18 mm. In certain embodiments, said predefined distance comprises at least one of 9.2 mm, 12.29 mm, 12.52 mm and 17.526 mm.

Said apparatus may comprise: a first surface for abutting said flange surface of said optical input device; and a second surface for abutting said optical processing portion; wherein said first and second surfaces are arranged at separation defined to set said predefined distance between a flange surface of said optical device, and an image plane of said optical processing portion, when said apparatus is coupled by said means for mechanically coupling the apparatus within said optical system. In this manner, it is ensured that the optical input device may produce a focused image upon the optical processing portion.

For retrofit, said means for mechanically coupling the apparatus can be configured to couple the apparatus to said optical input device within said optical system using an optical mount configured for mounting standardized interchangeable lenses.

For widespread application of the optical apparatus, said optical mount comprises a C-mount, a CS-mount, a D-mount or a Q-mount.

Said means for mechanically coupling the apparatus may further be configured for mechanically coupling the apparatus to said optical processing portion.

For compactness, preferably, said means for mechanically coupling the apparatus is integrated with said optical processing portion of said optical system.

The optical apparatus can further comprise a carrier for holding said at least one optical component, wherein the means for moving is arranged for moving the carrier such that the at least one optical component is moved between said aligned position and said non-aligned position.

The means for moving can comprise means for providing a motive force to drive movement of said carrier whereby to move said at least one optical component held in the carrier between said aligned position and said non-aligned position.

In certain embodiments, the carrier can be rotatably coupled to the apparatus and the means for moving is configured for rotating said carrier about an axis of rotation whereby to move said at least one optical component held in the carrier between said aligned position and said non-aligned position.

The means for moving can comprise a means for providing a motive force to drive rotation of said carrier.

For mechanical efficiency, the means for providing a motive force can be arranged to apply the motive force at a drive location on the carrier that is closer to an outer perimeter of said carrier than to the axis of rotation.

The drive location can be at a distance from the outer perimeter that is no greater than 25% of the distance between the outer perimeter and the axis of rotation (and more preferably no greater than 10% of the distance between the outer perimeter and the axis of rotation).

For structural rigidity, the means for providing a motive force can be arranged to apply the motive force at a drive location on the carrier that is diametrically opposed from a location of said means of mechanically coupling the apparatus.

The means for providing a motive force can comprise a motor arranged to provide said motive force.

The apparatus can further include: a transfer lens arrangement, comprising a first lens and a second lens, wherein the transfer lens arrangement is configured for location between said input device and said optical processor when the apparatus is coupled to said input device and said optical processor. When an optical component is arranged to intercept light from the optical input, the transfer lens allows parallel light to pass through optical component, thereby mitigating any optical aberrations that would occur should non-parallel light pass through the optical component.

When said at least one optical component is in the aligned position, said at least one optical component can be located between said first lens and said second lens of said transfer lens arrangement.

The optical apparatus further can include means for controlling said means for moving whereby to control movement of said at least one optical component between said aligned position and said non-aligned position.

The means for controlling can include at least one of a microcontroller/microprocessor and an input/output port for communicating with a peripheral device (e.g. a computer terminal).

The means for controlling can comprise the input/output port for communicating with a peripheral device and wherein the input/output port is adapted to provide electric power to the apparatus (e.g. to power a microcontroller/microprocessor and/or means for providing a motive force for moving said optical component between said aligned and non-aligned positions). Separate means for controlling and powering the optical apparatus are therefore not required.

According to another aspect of the invention there is provided an optical apparatus (preferably as described above), wherein said means for controlling comprises: at least one identifier for identifying when said at least one optical component is in said aligned position; and a sensor arranged to detect said at least one identifier, wherein the detection of said at least one identifier by the sensor arranged to detect said at least one identifier signifies that said at least one optical component is in said first aligned position. The alignment of optical components is therefore able to be determined when an optical component is present in the optical apparatus.

The apparatus can be arranged to hold a plurality of optical components and said means for moving is configured to move each of said plurality of optical components between said aligned position and the, or another, respective non-aligned position; wherein said at least one identifier comprises a plurality of identifiers; and wherein each of said plurality of identifiers is arranged for identifying when a respective one of said plurality of optical components is in said aligned position. Multiple possible positions of the optical component are thereby able to be determined.

One or more identifiers can include a code (e.g. a binary code) for indicating that a respective optical component is in said aligned positioned. The position of an optical component is thereby able to be uniquely determined.

The at least one identifier can include at least one magnet, wherein the polarity of the at least one magnet is arranged to represent a code (e.g. a binary code) for indicating that a respective optical component is in said aligned position. Advantageously, the magnet produces no optical interference, unlike, for example, IR identifiers.

For complementarity with the identifier comprising at least one magnet, the sensor can be arranged to detect the at least one identifier comprises a Hall Effect sensor.

The means for moving can be configured for moving the at least one optical component between said aligned and the, or another, non-aligned position in dependence on detection of the at least one identifier by the sensor arranged to detect said at least one identifier.

According to a further aspect of the invention, there is provided an optical arrangement for manipulating light in an optical system, which optical system comprises an optical input device for receiving light and an optical processing portion having an optical processor for processing the light received via the optical input device, the apparatus comprising: means for mechanically coupling the apparatus to said optical input device, within said optical system, such that light received via said optical input device passes from said optical input device, through said apparatus, onwards to said optical processor; a transfer lens arrangement comprising a first lens and a second lens, wherein the transfer lens arrangement is configured for location between said optical input device and said optical processor, when the apparatus is coupled to said optical input device within said optical system, such that light received via said optical input device passes through the first lens and then passes through the second lens onwards to said optical processor; and a carrier for holding at least one optical component in an aligned position in which said at least one optical component is located between said optical input device and said optical processor, and between said first lens and said second lens of said transfer lens arrangement, for manipulating light received via said optical input device and for passing light so manipulated to said optical processor. When an optical component is arranged to intercept light from the optical input, the transfer lens allows parallel light to pass through optical component, thereby mitigating any optical aberrations that would occur should non-parallel light pass through the optical component. Furthermore, the optical apparatus is arranged to fit between the optical input device and said optical processor allowing the full beamwidth of light from the optical input device to be intercepted by the optical component, when such a component is present and aligned.

The optical arrangement for manipulating light further can include a means for moving, when said apparatus is coupled by said means for mechanically coupling the apparatus within said optical system, at least one optical component between: said aligned position; and a non-aligned position, in which said optical component is not located between said optical input device and said optical processor.

The first lens of said transfer lens arrangement can be configured for collimating light received from the optical input device.

The second lens of said transfer lens arrangement can be configured for focusing light from the first lens onto an image plane of said optical processing portion.

The first lens and the second lens of said transfer lens arrangement can be arranged to have a focal point that coincides with the focal point of said optical input device, when the apparatus is coupled to said optical input device within the optical system, as such the focal length of the system remains unchanged when the transfer lens arrangement is present.

For retrofit, the optical input device can include an interchangeable camera lens.

The optical processing portion can include part of an imaging device (e.g. a camera) and said optical processing portion comprises an imaging sensor of said imaging device.

According to yet another aspect There is provided a filter apparatus for filtering light in a camera system, which camera system comprises an interchangeable camera lens for receiving light and an imaging portion having an imaging sensor for processing the light received via the camera lens, the apparatus comprising: means for mechanically coupling the filter apparatus to said camera lens, within said camera system, such that light received via said camera lens passes from said camera lens, through said filter apparatus, onwards to said imaging sensor; and means for moving, when said filter apparatus is coupled by said means for mechanically coupling the apparatus within said camera system, at least one filter between: an aligned position in which said filter is located between said camera lens and said imaging sensor, for manipulating light received via said camera lens and for passing light so manipulated to said imaging sensor; and a non-aligned position in which said filter is not located between said camera lens and said imaging sensor.

This disclosure pertains to an optical apparatus, optical arrangement and filter apparatus substantially as herein described and/or as illustrated with reference to the accompanying drawings.

This disclosure also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein. The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

Any apparatus feature as described herein may also be provided as a method feature, and vice versa. As used herein, means plus function features may be expressed alternatively in terms of their corresponding structure, such as a suitably programmed processor and associated memory.

Any feature in one aspect of the disclosure may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

In this specification the word 'or' can be interpreted in the exclusive or inclusive sense unless stated otherwise.

Furthermore, features implemented in hardware may generally be implemented in software, and vice versa. Any reference to software and hardware features herein should be construed accordingly.

The disclosure extends to a filter wheel and method of operating a filter wheel substantially as herein described with reference to the accompanying drawings.

FIG. 1 shows a filter wheel 100 that is adapted to be fitted between an optical input device 104 (in this example a lens) and a sensor portion 108 of, in this example, the camera.

By having a filter wheel 100 that is adapted to fit between the lens 104 and sensor portion 108, smaller (and hence more cost efficient) filters may be used to intercept the full beam diameter of light passing through the filter wheel. This arrangement therefore allows the filter wheel to be made significantly smaller, and hence lighter, than if the filter wheel were to be mounted upstream of the lens.

Designing a filter wheel that is adapted to be fitted between the lens and sensor of a camera (or other such optical apparatus) is, however, challenging because the location of a filter wheel optically downstream of the lens, between the lens and the sensor, has a greater potential to adversely affect the optics of the optical apparatus in which it is installed. This is a particular issue where the distance between the lens and the sensor is particularly small and there is therefore little room within which to fit the filter wheel without it affecting the optics unacceptably. For example, cameras (or other optical apparatus) may utilise an imaging lens that is based on a so-called "C-mount" thread design, where the rear of the lens mount is standardised to be a nominal 17.526 mm from the focal plane of the sensor.

FIGS. 2a to 2d show, in more detail, the filter wheel 100.

As seen in FIG. 2a, the filter wheel 100, shown in (in an exploded, perspective and cross-sectional view), comprises a frame (or housing) that is rigid 112; a movable carrier 116 (herein referred to as the "carousel"); a bearing 120; a drive system 124; a mounting portion 132; and a control circuit 128.

The frame 112 comprises a pair of generally planar parallel circular surfaces 112-1, 112-2 and circumferential sidewall 112-3 forming a cavity in which the carousel 116 is provided.

The mounting portion 132 (also referred to as a "coupling means") comprises: a lens mount 132-1 having an internally threaded aperture 136-1 for engaging with a complementary threaded portion of the lens 104; and a sensor mount 132-2 comprising an annulus having an external thread for engaging with a complementary threaded portion of the sensor portion 108. The lens and sensor mounts 132 are coaxially aligned with one another such that when, in operation, the lens 104 and sensor 108 are mounted to the filter wheel 100 they are optically aligned with one another along an optical axis 140. When, in operation, the lens 104 and sensor portion 108 are mounted to the filter wheel 100, the threaded aperture 136-1 of the lens mount 132-1 and a complementary aperture 136-2 defined by the annulus of the sensor mount 132-2 define an optical path from the lens 104, though the frame 112 of the filter wheel 100, to the sensor portion 108.

The carousel 116 is generally circular and is arranged within the frame 112 and coupled to the bearing 120 at (or near) the center of the carousel 116 so as to allow the carousel to be rotated relative to the frame about the bearing by means of the drive system 124, as controlled by the control circuit 128. The carousel comprises a plurality of cells 260 (eight cells in this embodiment, as seen in FIG. 2c) within each of which an optical component 144, such as a filter (and as herein also referred to as a "filter" 144), can be held. Each cell 260 is configured to allow light incident on an optical component 144 retained in that cell 260 to pass through the cell and that optical component 144. The cells 260 are arranged, as seen in FIG. 2c, equally spaced and radially equidistant around the periphery of the carousel.

The carousel 116 is configured such that, in use, the carousel can be rotated to align a cell 260 (and therefore any optical component held in that cell) with the optical axis 140 and hence the apertures 136 (which are of a generally similar shape and size to the cells 260).

Light is thereby able to pass from the lens 104, through the aperture 136-1 of the lens mount 132-1, along the optical path 140, through any optical component 144 retained in an aligned cell 260 (or to pass straight through an aligned cell 260 if no optical component 144 is retained in that cell 260) and onwards to the sensor portion 108 via the aperture 136-2 of the sensor mount 132-2.

Thus, it can be seen that, the frame 112 acts as a structural and protective encasement for the carousel 116 and also any optical components 144 retained in the cells 260. The frame 112 also acts to obscure all but one cell, i.e. the cell that aligns with the apertures 136 and mounting portion 132.

Figure 2B:
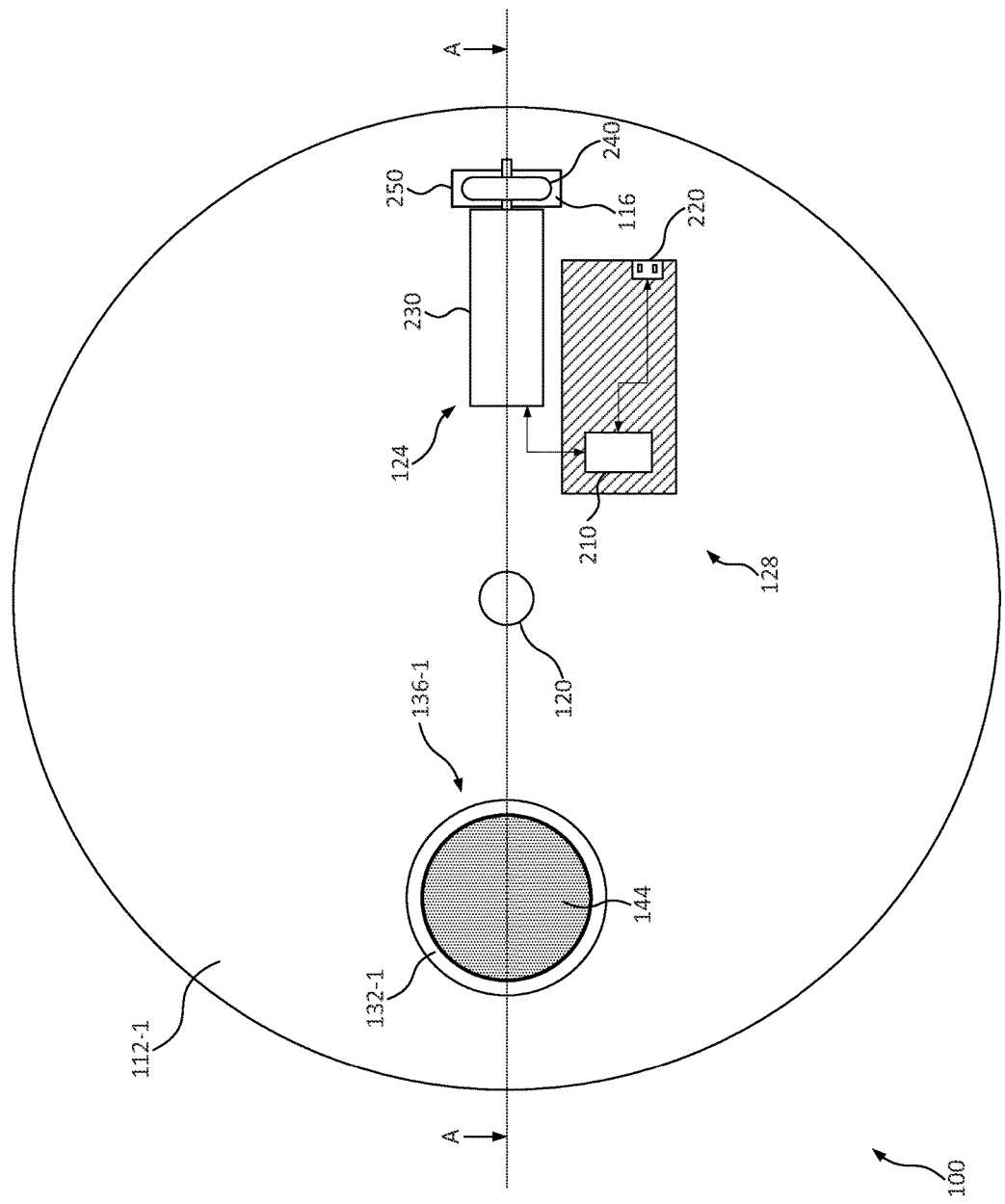
Figure 2C:
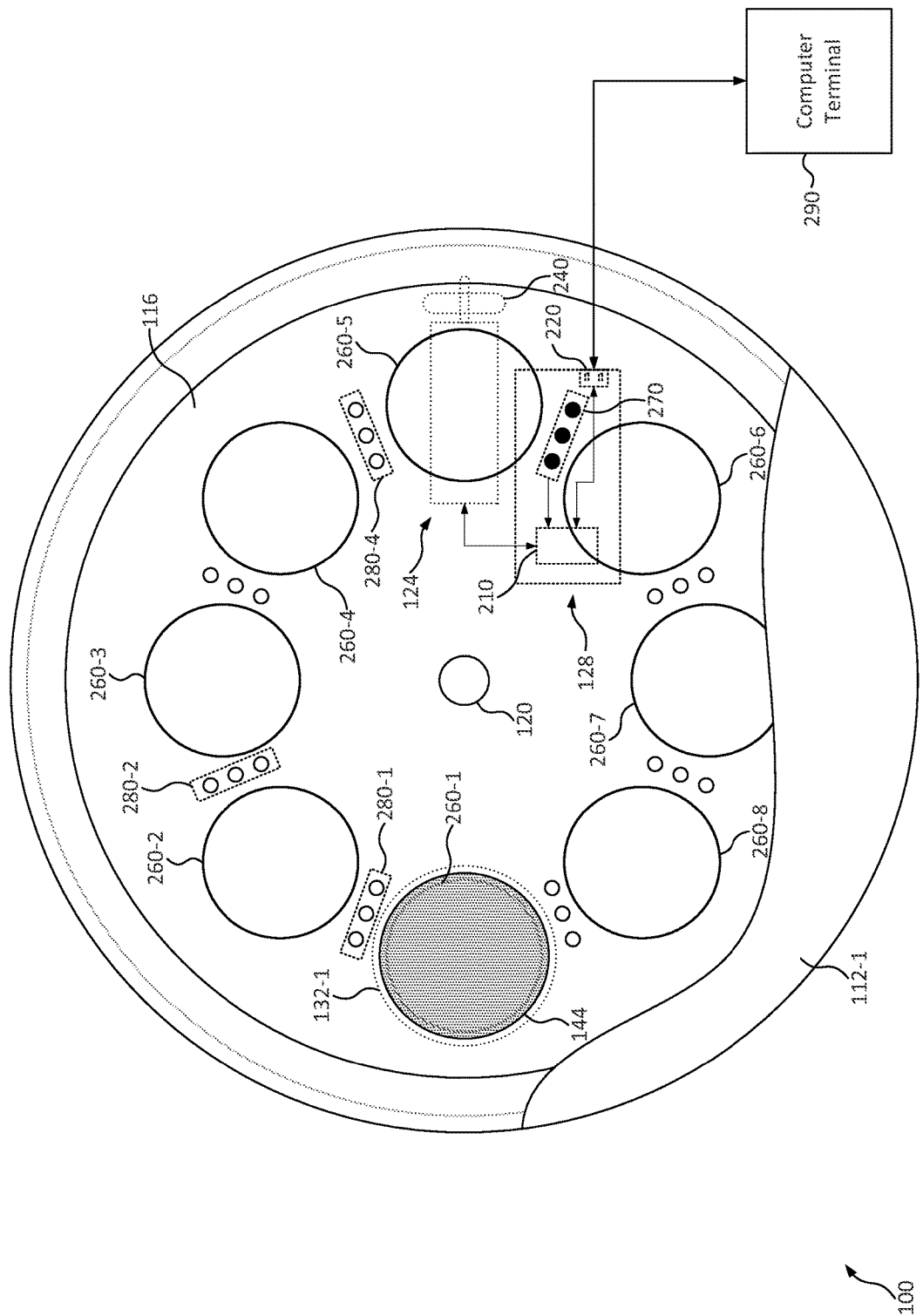

FIG. 2b shows a further view of the filter wheel 100. In particular, FIG. 2b shows an external ('plan') view of a lens-side of the filter wheel 100 and FIG. 2c shows the filter wheel from the same angle as FIG. 2b but through a cutaway in the frame.

As illustrated in FIG. 2b, the control circuit 128 comprises a microcontroller 210 and an input/output port 220 (for example a Universal Serial Bus (USB)). The control circuit, in this example, is attached to the outside of the frame (in order to save space within the frame) and is fixed relative to the carousel.

The drive system 124, in this embodiment, like the control circuit, is also arranged externally to the frame 112, and comprises a motor 230 for driving a friction wheel 240 that interfaces with the carousel 116. In order for the friction wheel to interface with the carousel, a slot 250 (or similar aperture) is provided in the frame 112 so that the friction wheel 240 can extend through the frame to make contact with the surface of the carousel in a manner that allows the carousel to be driven by the drive system 124. By providing the drive system 124 externally to the frame 112, the envelope of the frame can be made very thin (i.e. in a direction along the optical axis 140). The drive system 124 is arranged such that the friction wheel 240 engages with the carousel 116 near its perimeter (e.g. close to a maximum distance from the bearing 120/nearer to the radial edge of the carousel than to the carousel's centre), towards the periphery of the carousel for mechanical efficiency. Furthermore, the drive system is arranged generally opposite the mounting portion 132 across the surface of the filter wheel, such that the mounting portion 132, bearing and drive system are align along a transverse axis (e.g. across the diameter of the frame 112/carousel 116).

In more detail, the motor 230 is in the form of a miniature Direct Current (DC) motor, which comprises a reduction gearbox (preferably having a ratio of 200:1 to 50:1 and more preferably 100:1) and an output shaft connecting the motor 230 to the friction wheel 240. The friction wheel 240 is formed of a high friction (e.g. rubber like) material (e.g. silicone 'rubber', given that silicone is suitably unaffected by temperature variation and has a suitably high coefficient of friction—higher than, for example, nitrile rubber).

Each cell is provided with a respective identifier 280 located on the carousel 116 equally spaced and radially equidistant around the carousel 116. The control circuit 128 comprises a complementary sensor 270 for detecting the presence of the respective identifier 280 for each cell 260 when its respective identifier 280 is positioned appropriately proximate to (e.g. in alignment with) the sensor 270.

Each identifier 280 is used, in operation, to detect (via the sensor 270) discrete positions of the carousel 116, enabling the microcontroller 210 of the filter wheel 100 to infer the rotational orientation of the carousel and therefore the position of each cell and the alignment of that cell relative to the apertures 136 (and thus alignment with the lens 104 and sensor portion 108) and the mounting portion 132.

The sensor 270 is in communication with the microcontroller 210, which acts to process inputs from the sensor and/or drive system 124 as well as any instructions from a peripheral device, such as a computer terminal 290 communicating with the microcontroller via the input/output port 220.

For example and in summary, nominal first to eight cells 260-1 to 260-8 each has a corresponding identifier 280-1 to 280-8. The fifth cell 260-5 has an identifier 280-5 (as best shown in FIG. 2d) which, in the orientation seen in FIGS. 2c and 2d, is aligned with the sensor 270. When the carousel is in this orientation (such that identifier 280-5 aligns with the sensor 270) the microcontroller 210 determines that, given that the spacing of the cells is known, a cell (in this case cell 260-1) is aligned with the apertures 136 and thus, in use, is also aligned with the lens and sensor portion.

In order to allow the orientation of specific cells to be identified, each identifier 280, in this embodiment, takes the form of an arrangement of magnets encoding a respective unique binary code, based on the polarity of the magnets, thereby identifying a cell corresponding to the identifier. For example, the first cell 260-1 has an associated identifier 280-1 encoding, via three magnets, N-N-S (where "N" connotes a North polarity and "S" a South polarity) and the fifth cell 260-5 has an associated identifier 280-5 encoding S-S-N. When the corresponding identifier 280-5 of the fifth cell 260-5 is aligned with the sensor 270, the microcontroller 210 infers that the first cell 260-1 (which is four cells away from cell 260-5) is aligned with the apertures 136. The relative arrangement of the each cell 260 is known by the microcontroller 210, thus the absolute orientation of each specific cell is therefore available to be deduced by identifying the identifier that is aligned with the sensor 270 (and thus the cell corresponding to that identifier). Accordingly, for example, it is known that rotating the carousel to the next cell in an anti-clockwise direction (by a distance equal to the spacing between two cells) would align cell 260-2 with the apertures 136.

The sensor 270 comprises a Hall Effect sensor that detects the magnetic fields produced by the magnets of each identifier 280 when aligned with the sensor; for example S-S-N is detected when identifier 280-5 aligns with the sensor 270. Hence, it is established that cell 260-1 is aligned with the apertures 136. Advantageously, using Hall Effect sensors avoids the presence of stray (often infrared) light that may be emitted if a cell sensor-identifier arrangement comprising optical interrupters were to be used (although optical sensors may of course be used if there is reason do so).

The input/output port 220 allows for command inputs (for example instructing the microcontroller 210 to activate the drive system 124 and rotate the carousel to the next cell) to be received by the microcontroller 210 from the computer terminal 290 and allows for corresponding response outputs (such as a reading from the sensor 270 indicating that a cell is aligned with the apertures 136) to be received by the computer terminal 290. The input/output port 220 in this example is, advantageously, a Universal Serial Bus (USB) port and the control circuit 128 is arranged so that it communicates with the computer terminal 290 as if the control circuit 128 is a low-speed USB peripheral device. The motor of the drive system 124 is powered by the USB, which draws little current. A USB connection therefore allows for the microcontroller and motor to be powered, thus eliminating the need for a separate power supply for the drive system 124, microcontroller 210 and input/output port 220 of the control circuit 128 (providing further benefits in terms of the weight and size of the filter wheel apparatus).

For reference, the positions of the drive system 124, part of the control circuit 128 and lens mount 132-1 are indicated via dotted lines in FIG. 2c.

FIG. 2d shows a cross section of the filter wheel 100 (along the line indicated by "A" in FIG. 1). A distance, d, indicates the depth of the frame 112 (where the depth, d, is measured across the sidewall 112-3 and/or the lens mounts 132 of the filter wheel 100). In particular, FIG. 2d shows the lens mount 132-1 and the sensor mount 132-2 diametrically opposed across the depth, d, of the frame 112.

FIG. 3a shows a lens-sensor portion arrangement, between which the filter wheel 100 is available to be fitted via its mounting portion 132 (as described with reference to FIG. 3b). The sensor portion 108 is an optical sensor, for example a Charge-Coupled Device, an Active Pixel Sensor or photographic film. A prescribed separation, f, defines a distance between the lens 104 and sensor portion 108 in order for the lens 104 to form an image on the sensor portion 108 appropriately. The prescribed separation, f, is, for example, the flange focal distance of the lens-sensor portion arrangement, i.e. the focal distance between the mounting flange of the lens 104 and the sensor portion 108. In a typical application, f is between approximately 12 mm and 18 mm (and more specifically between 17.0 mm and 17.6 mm) in order to accommodate D-, CS- and/or C-mount lens-sensor portion arrangements. In effect, the filter wheel 100 acts as a spacer between the lens and sensor portion arrangement (typically 17.5 mm for a C-mount lens).

It will be appreciated by a person skilled in the art that the flange focal length is preferably measured from a flange surface of a mounting portion on the lens 104 to the image plane formed from that lens 104, wherein the mounting portion is coupled to the sensor portion 108 (either directly or via an adapter or spacer) so that the lens 104 is fixed to the sensor portion such that an optical sensor of the sensor portion 108 is coincident with the image plane from the lens 104 such that a suitably focussed image is available to be projected upon the optical sensor of the sensor portion 108.

Furthermore, given the degree of precision required of the flange focal length, a number of flange focal length standards are commonly used.

The filter wheel 100 is arranged such that the depth of the filter wheel is less than, or equal to, the flange focal length, i.e. d≤f, (although it will be appreciated that where d is significantly less than f, a spacer is used to maintain the flange focal length between the lens 104 and the sensor portion 108), hence the filter wheel is available to be positioned between the lens-sensor portion arrangement as exemplarily shown in FIG. 3b, in which the filter wheel is coupled to lens 104 and sensor portion 108 via the mounting portion 132. The depth of the filter wheel i.e. across the sidewall 112-3, is therefore arranged so that, when the filter wheel is coupled to the lens and sensor portion, separating the lens and sensor portion by the prescribed separation.

By incorporating the drive system and control circuit externally to the frame 112, the distance d is constrained by fewer components and is therefore free to be made very slim, allowing the filter wheel to fit between the lens and sensor portion, within the prescribed separation, f; the drive system and control circuit are also more readily accessed if arranged externally to the frame (albeit that these components may be better protected if incorporated within the frame).

By placing the filter wheel 100 between a lens 104 and sensor portion 108, a further advantageous optical arrangement may be realized as described with reference to FIGS. 3a and 3b, which schematically show the filter wheel 100 further comprising optical components for collimating light passing through a filter held within a cell of the carousel 116 without affecting the focal length of the lens-sensor portion arrangement.

The arrangement shown in FIG. 2, although advantageous with respect to the efficiency of the filter (in terms of the size of filter required in order for the full beamwidth of light from the lens to be incident upon the filter), means that the filter has a greater optical effect than if the filter were placed upstream of the lens 104. The optical effect of the filter, in part, manifests itself to alter the focal length from the lens 104. A further optical effect may occur where thin-film dichroic or interference filters (which are sensitive to the angle of incidence of incoming light) are used, producing bandwidth and center wavelength shifting. As a result, in order to mitigate these optical effects, it is desirable that, in particular where a filter is located between the lens 104 and sensor portion 108, optical components are used for making parallel light passing through a filter in the filter wheel and re-focusing the light having passed through the filter onto the sensor portion 108.

Accordingly, FIG. 4 show examples of the filter wheel 100 comprising an optical arrangement used to collimate light before it passes through the filter 144 and subsequently focus light on the sensor portion 108 (once the light has passed through the filter), where the filter wheel 100 is fitted between the lens 104 and sensor portion 108.

Figures 4A, 4B:
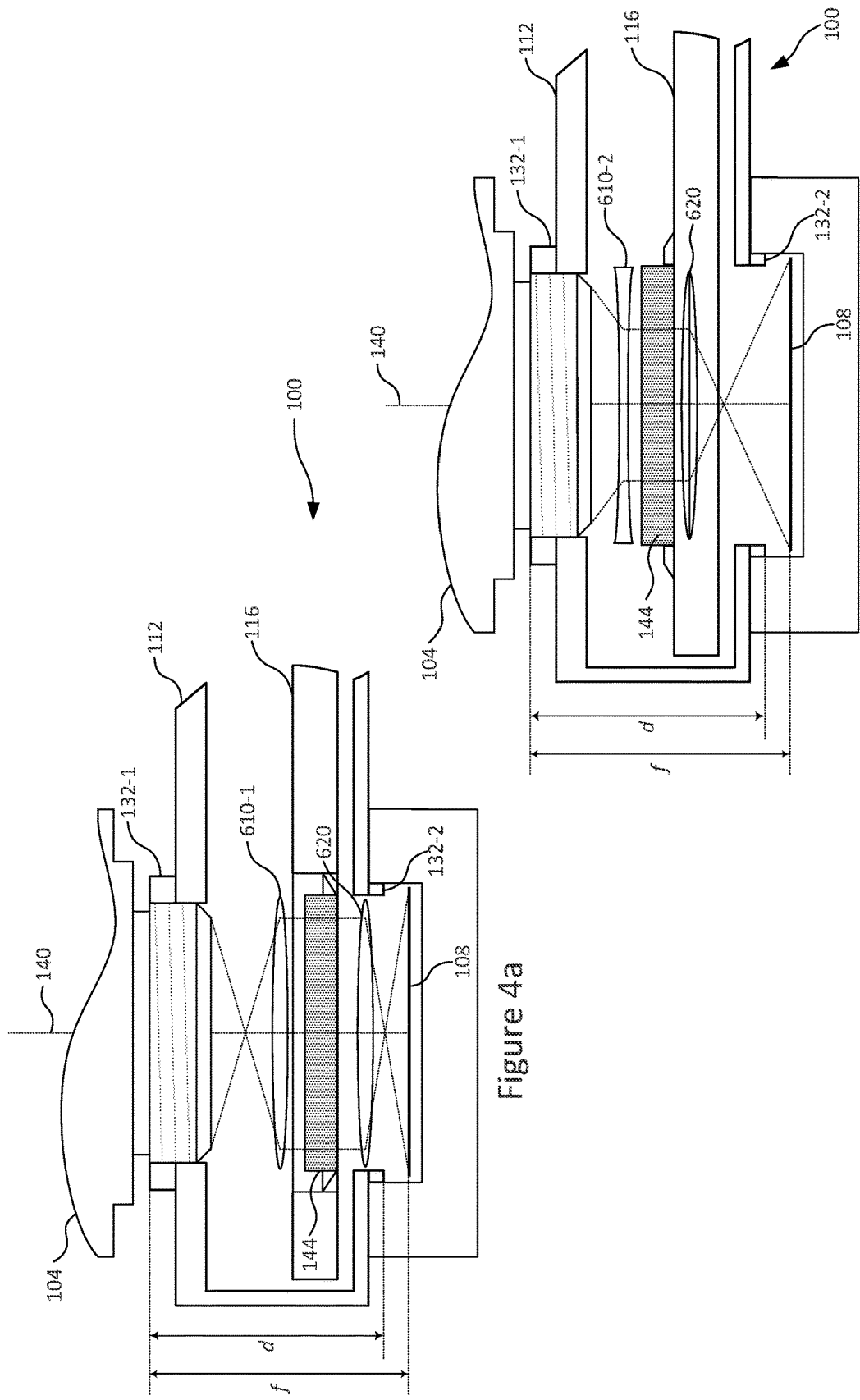
FIGS. 4a and 4b are optical arrangements for collimating light passing through the filter wheel.

In more detail, the beam output from the lens 104 in the optical downstream direction is collimated before passing through the filter 144 using a collimator 610, which takes the form of a first lens, which is (or has the effect of) a converging (positive) lens 610-1 (as described with reference to FIG. 4a and shown as a biconvex lens) or a diverging (negative) lens 610-2 (as described with reference to FIG. 4b and shown as a biconcave lens).

Once the light beam has been collimated and has passed through the filter 144 a second ("focusing") lens 620 acts to focus the light beam, having passed through the filter, upon the sensor portion 108, all whilst the prescribed separation, f, is maintained. The collimator 610 and second lens 620 are therefore arranged to fit between the lens 104 and sensor portion 108 also; this is achievable given that the filter wheel 100 is available to be made very slim.

The collimator 610 and second lens 620 act as a transfer lens pair (albeit that the collimator 610 and second lens 620 need not necessarily be formed exclusively of lenses, but instead mirrors or apertures, for example, and preferably any arrangement of optical components that allows collimated light to pass through the filter without altering the prescribed focal length between the lens 104 and sensor portion).

The collimator 610 and second lens 620 are fixed relative to the carousel 116 and are arranged either side of the carousel, aligning with the apertures 136 of the frame and the mounting portion 132 along the principal optical axis 140.

At the cost of adding the extra optical components of the lens 104 and sensor portion 108, the light passing through the filter wheel 100 is made parallel in order to minimize, in operation, the aberration a filter 144 in the filter wheel 100 might cause and, for dichroic and interference filters, improve considerably the performance of the filter. The collimator 610 and second lens 620 therefore counteract the detrimental optical effect that the filter may have on focus and/or bandwidth and center wavelength shifting.

While it will be appreciated by a person skilled in the art that the flange focal length of a lens-sensor portion arrangement may be extended using a transfer lens arrangement (and as such the significant restrictions that are imposed on the depth, d, of the filter wheel are avoided) a different problem is introduced, whereby the optics of the transfer lens arrangement produce divergence of off-axis rays, in particular where the transfer lens arrangement is arranged to extend the focal length significantly.

For clarity, the collimator 610 and second lens 620 are shown as single lenses In FIG. 4; however, a plurality of optical components that achieve the same effects may be used. Furthermore, the light rays have been shown schematically throughout FIGS. 3 and 4.

FIGS. 5a-c show various exemplary alternative forms of the filter wheel 100.

In particular, FIG. 5a shows the filter wheel having a "minimal" frame 112, i.e. such that the frame 112 envelopes the carousel to substantially the least extent, but with the frame being able to provide rigidity such that the drive system 124 and/or control circuit 128 is mounted upon the frame and allow the filter wheel to be rigidly coupled to the lens 104 and sensor portion 108 via the mounting portion 132. As such, the frame 112 comprises spokes emanating from the bearing 120. Greater access to components, including filters, is thereby enabled in this example, along with further reduction in the filter wheels weight, albeit at the expense of protecting the carousel 116 and filters 144. The drive system 124 is supported on one of the spokes of the frame 112 (which extends partially across the radius of the filter wheel 100 from the bearing 120) and allows the friction wheel 240 to interface with the carousel 116.

FIG. 5b shows a further alternative where the frame 112 wholly encases the carousel 116 with the exception of the slot 250 provided to allow the drive system 124 to contact the carousel 116 and the apertures 132. Wholly encasing the carousel 116 with the frame (to the greatest extent possible) is advantageous in that protection is provided for optical components 144 within the filter wheel 100, albeit at the expense of adding further complexity to the device.

FIG. 5c shows yet a further alternative, where the frame 112, unlike the filter wheel shown in FIG. 5b, also encases the dive system 124 and control circuit 128 in a bulbous portion arranged across the diameter of the filter wheel 100 from the mounting portion 132. Notably, the depth of the filter wheel in the region proximate to the mounting portion 132 is such that the filter wheel is available to be fit between a lens 104 and sensor portion 108, even though the bulbous portion may not be. Encasing dive system 124 and control circuit 128, although more complex and cumbersome, provides protection to the dive system 124 and control circuit 128.

In a further alternative, the drive system 124 comprises a means of inserting into or remove from a beam of light optical components held in the carousel, for example by a sliding or rotating mechanism, and thereby also allow several different optical components to be swapped, either manually or by electric power, as required. For example a cog- or belt-based mechanism is used. In another example, the drive system 124 operates to rotate the carousel 116 by contactless means, for example using a magnetic drive, thereby allowing the carousel to be fully enclosed by the frame 112 in use (e.g. when the filter wheel 100 is coupled to the lens-sensor portion arrangement).

The identifier 280 and sensor 270 comprise, in one alternative, mechanical switches corresponding to each cell indicating the orientation of the carousel 116 as switches are triggered with the rotation of the carousel 116.

Although an embodiment having eight cells has been described there may be any number of cells, including a single cell, although the benefits provided by the filter wheel are particularly beneficial where there are a plurality of cells (e.g. four or more cells).

In one example, the lens 104 is part of the optical apparatus of a microscope, telescope or camera, for example the lens 104 is an objective lens.

While the present invention is primarily described with reference to C-mounts, the filter wheel is adapted to be fitted between a lens 104 and sensor portion 108 that are configured according to the CS- and D-mount standards or, more generally, where the prescribed separation is less than 30 mm, 20 mm or 15 mm.

In an alternative embodiment, each cell 260 comprises a different filter integrally formed into each cell, rather than being held in place in the cell.

It will be appreciated that the filter wheel may be coupled to the lens 104 and/or camera 108 using adapters and/or mounts that are known in the art such that the filter wheel fits within the prescribed separation and such that the prescribed separation is maintained. The specifications of the mounting portion may be governed by various standard optical mounts (and therefore may, for example, comprise a bayonet and/or breech lock).

It will be appreciated by a person skilled in the art, that the lens 104 and/or sensor portion 108 may be integrated with the filter wheel 100.

It is appreciated that the carousel 116 may take the form of anybody available to hold an optical component such that the optical component is maneuverable (by moving the body in which the optical comment is held) into or out of alignment with the mounting portion. The body may therefore take the form of a reciprocal slide or a linear conveyor for example.

It will be understood that the present invention has been described above purely by way of example, and modifications of detail can be made within the scope of the invention.

Each feature disclosed in the description, and (where appropriate) the claims and drawings may be provided independently or in any appropriate combination.

Reference numerals appearing in the claims are by way of illustration only and shall have no limiting effect on the scope of the claims.

Whilst in the above embodiment, the mounting portion secures the frame to the lens and/or camera via an internal (female) screw thread and an external (male) screw thread.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An optical apparatus for manipulating light in an optical system, which optical system comprises an optical input device for receiving light and an optical processing portion having an optical processor for processing the light received via the optical input device, the apparatus comprising:
   means for mechanically coupling the apparatus to said optical input device, within said optical system, such that light received via said optical input device passes from said optical input device, through said apparatus, onwards to said optical processor; and
   means for moving, when said apparatus is coupled by said means for mechanically coupling the apparatus within said optical system, at least one optical component between:
   a) an aligned position in which said optical component is located between said optical input device and said optical processor, for manipulating light received via said optical input device and for passing light so manipulated to said optical processor; and
   b) a non-aligned position in which said optical component is not located between said optical input device and said optical processor.

2. The optical apparatus according to claim 1, wherein said means for mechanically coupling the apparatus is configured for maintaining, when said apparatus is coupled by said means for mechanically coupling the apparatus to said optical input device, a predefined distance between a surface of said optical input device and an image plane of said optical processor.

3. The optical apparatus according to claim 2, wherein said predefined distance is not more than 30 mm, preferably not more than 20 mm and more preferably not more than 18 mm.

4. The optical apparatus according to claim 2, wherein said predefined distance comprises at least one of 9.2 mm, 12.29 mm, 12.52 mm and 17.526 mm.

5. The optical apparatus according to claim 1, wherein said apparatus further comprises: a first surface for abutting said flange surface of said optical input device; and a second surface for abutting said optical processing portion; wherein said first and second surfaces are arranged at separation defined to set said predefined distance between a flange surface of said optical device, and an image plane of said optical processing portion, when said apparatus is coupled by said means for mechanically coupling the apparatus within said optical system.

6. The optical apparatus according to claim 1, wherein said means for mechanically coupling the apparatus is configured to couple the apparatus to said optical input device within said optical system using an optical mount configured for mounting standardized interchangeable lenses.

7. The optical apparatus according to claim 6, wherein said optical mount comprises a C-mount, a CS-mount, a D-mount or a Q-mount.

8. The optical apparatus according to claim 1, wherein said means for mechanically coupling the apparatus is further configured for mechanically coupling the apparatus to said optical processing portion.

9. The optical apparatus according to claim 1, wherein said means for mechanically coupling the apparatus is integrated with said optical processing portion of said optical system.

10. The optical apparatus according to claim 1, further comprising a carrier for holding said at least one optical component, wherein the means for moving is arranged for moving the carrier such that the at least one optical component is moved between said aligned position and said non-aligned position.

11. The optical apparatus according to claim 10, wherein the means for moving comprises a means for providing a motive force to drive movement of said carrier whereby to move said at least one optical component held in the carrier between said aligned position and said non-aligned position.

12. The optical apparatus according to claim 10, wherein the carrier is rotatably coupled to the apparatus and the means for moving is configured for rotating said carrier about an axis of rotation whereby to move said at least one optical component held in the carrier between said aligned position and said non-aligned position.

13. The optical apparatus according to claim 12, wherein the means for moving comprises a means for providing a motive force to drive rotation of said carrier.

14. The optical apparatus according to claim 13 wherein the means for providing a motive force is arranged to apply the motive force at a drive location on the carrier that is closer to an outer perimeter of said carrier than to the axis of rotation.

15. The optical apparatus according to claim 14 wherein the drive location is at a distance from the outer perimeter that is no greater than 25% of the distance between the outer perimeter and the axis of rotation.

16. The optical apparatus according to claim 14 wherein the drive location is at a distance from the outer perimeter that is no greater than 10% of the distance between the outer perimeter and the axis of rotation.

17. The optical apparatus according to any of claim 11 wherein the means for providing a motive force is arranged to apply the motive force at a drive location on the carrier that is diametrically opposed from a location of said means of mechanically coupling the apparatus.

18. The optical apparatus according to any of claim 11 wherein the means for providing a motive force comprises a motor arranged to provide said motive force.

19. The optical apparatus according to claim 1, wherein said apparatus further comprises: a transfer lens arrangement, comprising a first lens and a second lens, wherein the transfer lens arrangement is configured for location between said input device and said optical processor when the apparatus is coupled to said input device and said optical processor.

20. The optical apparatus according to claim 19, wherein when said at least one optical component is in the aligned position, said at least one optical component is located between said first lens and said second lens of said transfer lens arrangement.

21. The optical apparatus according to claim 1, further comprising means for controlling said means for moving whereby to control movement of said at least one optical component between said aligned position and said non-aligned position.

22. The optical apparatus according to claim 21 wherein the means for controlling comprises at least one of a microcontroller/microprocessor and an input/output port for communicating with a peripheral device.

23. The optical apparatus according to claim 22, wherein the means for controlling comprises the input/output port for communicating with a peripheral device and wherein the input/output port is adapted to provide electric power to the apparatus.

24. The optical apparatus according to claim 23 wherein means for controlling comprises the input/output port for communicating with a peripheral device and wherein the input/output port is adapted to provide electric power to a microcontroller/microprocessor and/or means for providing a motive force for moving said optical component between said aligned and non-aligned positions.

25. The optical apparatus according to claim 1, wherein:
the optical apparatus for maintaining light in an optical system is a filter apparatus for filtering light in a camera system;
the optical input device in an interchangeable camera lens;
the optical processing portion having an optical processor in an imaging portion having an imaging sensor for processing light; and
the at least one optical component is at least one filter.

* * * * *